April 13, 1965   F. T. SWEET ETAL   3,178,287
THIN PHOTOGRAPHICALLY SENSITIVE FILM ELEMENT
Filed May 23, 1960
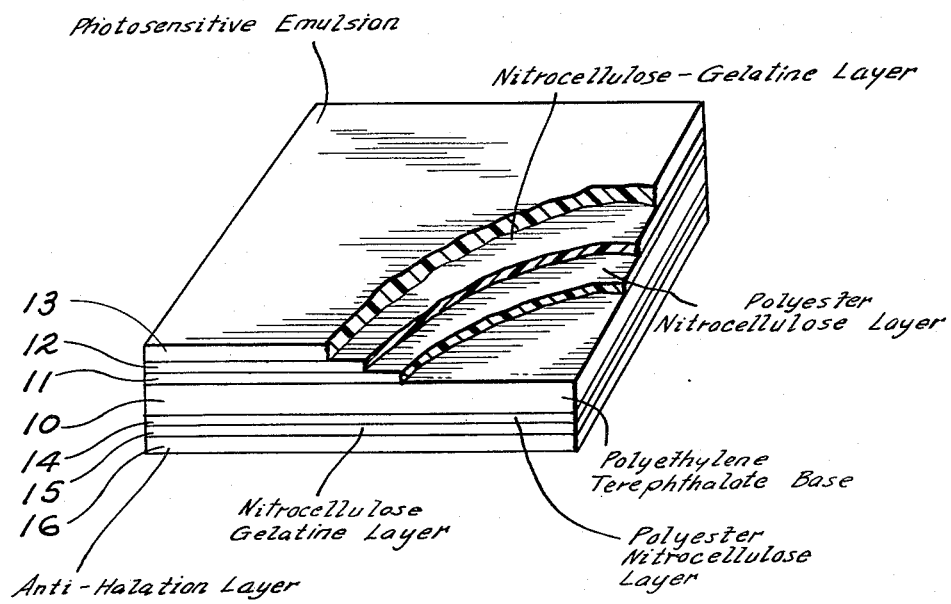
INVENTORS
FRANKLIN T. SWEET &
BY NICK G. BRANIBAR
Bosworth, Sessions,
Herrstrom & Knowles
ATTORNEYS United States Patent Office 3,178,287
Patented Apr. 13, 1965

3,178,287
THIN PHOTOGRAPHICALLY SENSITIVE
FILM ELEMENT
Franklin T. Sweet, Chagrin Falls, and Nick G. Branibar, Parma, Ohio, assignors, by mesne assignments, to Minnesota Mining and Manufacturing Company, a corporation of Delaware
Filed May 23, 1960, Ser. No. 31,101
4 Claims. (Cl. 96—84)

This invention relates to photographic film and more particularly to photographic film for use in the graphic arts; i.e., in photomechanical reproduction processes.

A general object of the invention is to provide a film of such extreme thinness that it will give excellent results with fine definition in photographic reproduction processes whether the emulsion is "down" (i.e., in contact with the sensitized surface of a printing plate or the like to be exposed through the film) or "up" (i.e., separated from the sensitized surface or the like by the thickness of the film base). Other objects are the provision of a film capable of producing images of superior definition; the provision of a film having excellent anti-halation qualities, the provision of a film that eliminates the need for using stripping film, and the provision of a film that is useful in many photographic reproduction processes. A further object is the provision of a film that is extremely thin, yet is strong and has good dimensional stability. Another object is the provision of a subbing system especially adapted to secure a photographic emulsion to a film base such as a polyester base.

Ordinary photographic film used in the graphic arts is so thick that good definition and satisfactory results cannot be obtained if the emulsion is separated from the photo-sensitized surface of a printing plate, for example, by the film base on which the photographic emulsion is coated. Thus, in the manufacture of etched printing plates, for example, it has been necessary to use stripping film. In the usual process, a negative of the subject to be reproduced is made on a stripping film in which the sensitized emulsion is mounted on a temporary support. After the negative has been exposed and developed, the very delicate membrane carrying the emulsion is stripped off of the temporary support and cemented to a glass plate. The plate carrying the negative membrane is arranged with the membrane in contact with the sensitized coating on the printing plate and the exposure made. The stripping operation is required because it is necessary that the original negative be turned over to make the negative "right" or readable, so that the plate will be "wrong" and in the image printed by the plate will be correct or readable.

The stripping film required for this conventional process is expensive. It must be handled with care. The operations of stripping the film from its temporary support and cementing it to a glass support are expensive and time consuming and require considerable skill on the part of the operator. These operations can also introduce inaccuracies into the reproduction. The stripping film must be used instead of using the conventional negative material because if the conventional negative were employed the image-carrying emulsion would be spaced from the sensitized surface of the metal printing plate by the thickness of the film base; this spacing with conventional film bases is so great that the image produced in the sensitized coating on the plate is not of sufficiently high quality and lacks the definition required for good quality printing.

In producing a printing plate with the film of the present invention, the use of stripping film is eliminated. It is only necessary to expose the film in the usual manner with the emulsion side up. The film is then developed and is applied to the sensitized surface of the metal plate, again with the emulsion side up. Because of the extreme thinness of the film of the present invention, exposure can be made with the emulsion side up and with the emulsion separated from the sensitized coating on the metal plate by thickness of the film base and the other coatings on the film base without detectable loss of sharpness and without undesirable undercutting or distortion of the image on the metal plate. The thinness and the character of the film base and the various layers carried thereby are such that diffusion of light within the base is negligible and distortion of the image because of the spacing between the emulsion and the sensitized surface of the metal plate is also negligible.

The thin film of the present invention is also advantageous in other photographic processes. For example, in photolithography where laterally reversed positives are required, the negative is initially made on the film of the present invention. A positive is then made by contact printing of the negative on the positive with the emulsion of both negative and positive in contact with each other. The image is then formed on the plate by printing through the positive with the positive placed on the sensitized surface of the plate with its emulsion up; i.e., out of contact with the sensitized surface. The extreme thinness of the film makes possible this method without loss of definition, whereas with ordinary materials, the positive is made with the emulsion of the negative out of contact with the emulsion of the positive and the usual film is of such thickness that noticeable loss of quality results. The film of the present invention is so thin that it produces excellent results with the emulsion either up or down. The ability to use the film in either position gives great flexibility of operation in a variety of photo-reproduction processes and frequently makes possible the elimination of expensive, time-consuming steps.

These advantageous results are obtained according to the present invention by means of a photographic film that is of extremely low total thickness. Preferably, the finished film has a total thickness of from .0023 to .0025 inch, although thicknesses as great as .00275 inch give reasonably satisfactory results. Thicknesses of .0030 inch or more are unsatisfactory because of distortion and undercutting in etched plates, diffusion of the image in the film base and general lack of definition in the reproduced image. The film can be made as thin as possible consistent with strength and dimensional stability.

According to the present invention, film of great strength and yet of the required thinness is produced at reasonable cost by utilizing a film base composed of a clear, flexible, polyester sheeting having a thickness that preferably does not exceed about .002 inch. A thin anti-halation coating is coated on one side of the base and on the other side there is a very thin, high density photographic emulsion. The anti-halation coating and the emulsion are caused to adhere to the base by subbing layers that are of little more than molecular thickness.

A preferred form of film made according to our invention is illustrated in the drawings, in which the single figure is a diagrammatic view showing the several layers making up the film in greatly exaggerated thickness and with the relative thicknesses of the various layers not necessarily in correct scale.

As shown in the drawing, a preferred form of film embodying the invention comprises a sheet of base material 10; on one side of the sheet there are subbing layers 11 and 12 and a thin, dense emulsion 13; on the other side of the sheet there are subbing layers 14 and 15 and an anti-halation and anti-curling layer 16.

The base 10 preferably comprises a flexible sheet of biaxially oriented, hydrophobic polyester material having a thickness of from about .0015 inch to about .0020 inch. The polyester resin film sold under the trademark "Mylar" gives excellent results. This material is a hydrophobic ethylene glycol terephthalate resin. The film base should be as thin as possible so long as it has adequate dimensional stability and sufficient strength to permit handling without requiring undue care. In order for the film to have the desired optical qualities the thickness of the base should not exceed 0.002 inch by more than 0.0002 or 0.0003 inch so that the total thickness of the film, including all of the coatings, will not exceed .00275 inch.

The subbing layers 11 and 12 and 14 and 15 are respectively identical. The first subbing layers 11 and 14 are preferably made according to the following formulation:

|  | Preferred, percent by weight | Range, percent by weight |
| --- | --- | --- |
| Acetone | 55 | 40-60 |
| Dioxane | 45 | 50-30 |
| Easily soluble high molecular weight linear polyester resin | 5 | 2-10 |
| Difficultly soluble high molecular weight linear polyester resin | 2½ | 5-1 |
| Nitrocellulose (SS ½° N/C) | 2½ | 1-5 |

A satisfactory difficultly soluble resin for the purpose is a resin of the ethylene tere-isophthalate type. For the readily soluble resin a similar ethylene tere-isophthalate resin with a glycol modifier is preferably employed. In making the subbing solution, first the nitrocellulose and then the polyester resins are dissolved in the solvents, which have been mixed together.

Another formulation that is satisfactory for the first subbing layers 11 and 14 is as follows:

|  | Preferred, percent by weight | Range, percent by weight |
| --- | --- | --- |
| Dioxane | 70.0 | 65-75 |
| Acetone or methyl ethyl ketone | 25.0 | 20-30 |
| Nitrocellulose (SS ½° N/C) | 1.75 | 1-2 |
| Difficultly soluble high molecular weight linear polyester resin | 1.5 | 1-2 |
| Poly-isocyanate | 1.75 | 1-2 |

Preferably the same resin is used in this formulation as in the first formulation given above. This subbing solution is made by first dissolving the nitrocellulose in the solvents, which have been mixed together, and then dissolving the polyester resin. Thereafter the isocyanate is added. The isocyanate appears to act as a curing agent to speed up the setting of the polyester resin.

The coating and drying operations may be carried out in the same manner for both of the subbing solutions. The solution that has been selected is coated on both sides of the base 10 by conventional methods. For example, the subbing layers may be applied by dip coating, knife coating, air knife coating or reverse roll coating. After coating, the material is dried by any convenient method, but preferably at a temperature of about 220° to 250° F. The rather elevated temperature appears to promote the adhesion of the subbing layers to the base. In the case of the first subbing solution given above, the residue consists principally of a very thin layer composed of nitrocellulose and polyester resins that is firmly bonded to the polyester film base. If the second solution is employed, the coating again consists principally of a very thin layer of nitrocellulose and polyester resin with the addition of the poly-isocyanate. These are firmly bonded to the polyester film base. It is our belief that the polyester resin content insures adhesion of the first subbing layer to the polyester film base, while the nitrocellulose content of the first layer provides a surface to which the second subbing layer adheres.

After the first subbing layers 11 and 14 have been dried, the second subbing layers 12 and 15 are applied over them. These subbing layers are preferably made according to the following formulation:

|  | Preferred, percent by weight | Range, percent by weight |
| --- | --- | --- |
| Gelatine | 2 | ½-3½ |
| Glacial Acetic or Formic Acid | 6 | 4-10 |
| Water | 3 | 2-4 |
| Methyl Alcohol | 63 | 60-70 |
| Acetone or Methyl Ethyl Ketone | 22 |  |
| High Boiling Solvent such as Butyl Carbitol, Cellosolve, or Cellosolve Acetate | 3 | 2-4 |
| Nitrocellulose (SS ½° N/C) | 1 | ½-1½ |

The above material is applied to a base sheet that previously has been provided with layers 11 and 14 by a conventional method such as one of the methods outlined above. The coated film is then subjected to a drying operation, preferably at a temperature of approximately 120°.

When dried, the second subbing layers 12 and 15 consist essentially of very thin layers of a mixture of gelatine and nitrocellulose; these layers adhere firmly to the first subbing layers and provide a surface on which the emulsion 13 and the anti-halation layer 16 can be deposited without difficulty. Together, the layers provide a subbing system which functions firmly to bond the emulsion and the anti-halation coating to the film base. While two subbing layers are employed, they are of extreme thinness, the total thickness of the four subbing layers being so small that the layers do not materially increase the total thickness of the completed film.

After the subbing layers 12 and 15 have been dried, the film is coated with the emulsion 13 and the anti-halation coating 16 in a conventional manner. The emulsion preferably is a gelatino-silver halide emulsion. The emulsion, however, contains a higher proportion of silver than the usual emulsion and accordingly the emulsion coating can be made thin and yet give the required density of image. Preferably, the emulsion has a thickness of from about .00015 to .00025 inch and contains sufficient silver so that the developed image has a density of at least 6.00 on the light transmission density scale.

The emulsion is balanced by an anti-halation and anti-curling coating consisting of gelatine containing a suitable conventional dye; the anti-halation coating also is very thin, preferably having a thickness of about .00015 to .00025. The total thickness of the film when a base having a thickness of .002 inch is employed thus is within the range of from .00023 to .00025 inch. If a thinner base is employed, the total thickness of the film will be correspondingly reduced.

As noted above, the thin film of the present invention places the image-bearing emulsion so close to the other side of the film that excellent results can be obtained whether the emulsion is face down or face up in carrying out contact printing operations. Another advantage of the thin film base is found in the fact that halation is materially reduced. Even with anti-halation coating on ordinary film, the effect of halation is noticeable in the sharpness of the dots in a half tone plate or negative. With the present extremely thin film, the anti-halation layer is so close to the emulsion that there is no noticeable halation effect even on the dots in a half tone negative. Furthermore, the thinness of the film base minimizes the diffusion and distortion that might otherwise occur because of reflection and refraction of light passing through the emulsion and into the film base. Thus, the film of the present invention produces half-tone negatives of exceptional sharpness and, as noted above, these negatives can be used emulsion side up in the production of etched printing plates.

While it is ordinarily difficult to secure proper adherence of emulsions to polyester base materials, and particularly to oriented, hydrophobic polyethylene terephthalate films, the sub-strata of the present invention firmly bond both the emulsion and the anti-halation layer to the underlying film base. It is to be noted that the subbing layers are applied directly to the oriented film without requiring any preliminary treatment or coating thereon. Also, the film can be stored for reasonable lengths of time—a matter of weeks, at least—after the subbing layers have been applied to it, and then coated with the emulsion and the anti-halation backing without noticeable loss of adhesion. The emulsion and the anti-halation layer are firmly adherent to the base when dry and also during and after processing. The emulsion does not flake or peel off during handling or processing of the film in spite of the fact that the film, because of its thinness, is extremely flexible.

The dimensional stability of the base material, even though it is of extreme thinness, is excellent and printing plates produced with film made according to the present invention are much more accurate than plates produced in the conventional manner by the use of stripping film. This is of especial importance in connection with color work.

Another advantage of the film of the present invention is found in connection with photo type setting processes and the like in which long rolls of film are employed. Because of the thinness of the film, about three times as much footage of film can be accommodated on a given roll than with conventional films of normal thickness. The thin film also is not as likely to take a permanent set from being rolled as normal film; and, because of the thinness of the film, it can be used as either a right or wrong reading negative without substantial loss of definition.

Those skilled in the art will appreciate that various changes and modifications can be made in the preferred form of the invention described above without departing from the spirit or scope of the invention. The essential characteristics of the invention are set forth in the appended claims.

We claim:
1. A photographic film comprising a clear, flexible sheet of oriented hydrophobic polyethylene terephthalate with a thickness between about 0.0015 and about 0.0020 inch and having on at least one side thereof a substratum consisting essentially of a first layer composed of 3 to 15 parts of a high molecular weight linear condensation polymer consisting essentially of ethylene tere-isophthalate polymer and 1 to 5 parts of nitrocellulose and, superimposed thereon, a second layer composed of 1 to 3 parts of nitrocellulose and 1 to 7 parts of gelatin, and a photosensitive gelatino-silver halide emulsion adhering to said substratum and having a thickness of from about 0.00015 to 0.00025 inch and containing sufficient silver so that the developed image has a density of at least 6.00 on the light transmission density scale, the total thickness of said film being not in excess of 0.00275 inch.

2. The photographic film of claim 1 wherein said linear condensation polymer consists essentially of from 2 to 10 parts of a polyethylene tere-isophthalate polymer which is easily soluble in acetone-dioxane solvent and from 1 to 5 parts of a polyethylene tere-isophthalate polymer which is difficultly soluble in acetone-dioxane solvent.

3. A photographic film comprising a clear, flexible sheet of oriented hydrophobic polyethylene terephthalate with a thickness between about 0.0015 and about 0.0020 inch and having on each side thereof a substratum consisting essentially of a first layer composed of 3 to 15 parts of a high molecular weight linear condensation polymer consisting essentially of ethylene tere-isophthalate polymer and 1 to 5 parts of nitrocellulose and, superimposed thereon, a second layer composed of 1 to 3 parts of nitrocellulose and 1 to 7 parts of gelatine, one substratum bearing a photosensitive gelatino-silver halide emulsion coating having a thickness of from about 0.00015 to 0.00025 inch and containing sufficient silver so that the developed image has a density of at least 6.00 on the light transmission density scale, and the other substratum bearing a dyed gelatine anti-halation coating, the total thickness of said film being not in excess of 0.00275 inch.

4. The photographic film of claim 3 wherein said linear condensation polymer consists essentially of from 2 to 10 parts by weight of an ethylene tere-isophthalate polymer which is easily soluble in acetone-dioxane solvent and from 1 to 5 parts by weight of an ethylene tere-isophthalate polymer which is difficultly soluble in acetone-dioxane solvent.

References Cited by the Examiner

UNITED STATES PATENTS

| | | | |
|---|---|---|---|
| 2,462,185 | 2/48 | Hauser | 117—73 |
| 2,627,088 | 2/53 | Alles et al. | 96—84 |
| 2,698,239 | 12/54 | Alles et al. | 96—87 |
| 2,698,241 | 12/54 | Saner | 96—87 |
| 2,703,284 | 3/55 | White et al. | 96—87 |
| 2,794,742 | 6/57 | Fowler et al. | 96—87 |
| 2,835,609 | 5/58 | Starck et al. | 117—73 |
| 2,874,046 | 2/59 | Klockgether | 96—87 |
| 2,972,534 | 2/61 | Ben-Ezra et al. | 96—87 |
| 3,053,661 | 9/62 | Starck et al. | 96—87 |
| 3,054,673 | 9/62 | Bostwick | 96—87 |

FOREIGN PATENTS

| | | |
|---|---|---|
| 822,894 | 11/59 | Great Britain. |
| 522,162 | 2/56 | Canada. |
| 222,675 | 1/58 | Australia. |

OTHER REFERENCES

Modern Photography, May 1959, pp. 72–75 and 147.

NORMAN G. TORCHIN, *Primary Examiner.*

PHILIP E. MANGAN, *Examiner.*